United States Patent Office 3,146,164
Patented Aug. 25, 1964

3,146,164
SOLUTIONS OF STEROID PHOSPHATE AND BASIC ANTIBIOTICS STABILIZED WITH CREATININE
Thomas J. Macek, Glenside, and John D. Mullins, Lansdale, Pa., and Philip A. Ouellette, Rahway, N.J., assignors to Merck & Co., Inc., Rahway, N.J., a corporation of New Jersey
No Drawing. Filed Aug. 9, 1960, Ser. No. 48,343
10 Claims. (Cl. 167—77)

This invention relates to pharmaceutical formulations. More particularly, it relates to stable aqueous solutions suitable for topical application, comprising in effective amounts a water-soluble steroid and an antibiotic.

Steroid therapy has found extensive use in topical application for preventing or suppressing inflammatory reactions of various kinds. However, the use of steroids in topical solutions has only recently become of interest because of the prior unavailability of soluble steroids and the difficulties inherent in forming solutions of the steroids to be used for this purpose. With the advent of steroid phosphates, particularly phosphates of the anti-inflammatory steroids such as, for example, cortisone, hydrocortisone, prednisone and prednisolone phosphates, the feasibility of formulating aqueous solutions of these steroids has been recognized. In many instances, it has been found desirable to utilize antibiotics, particularly basic antibiotics, in conjunction with steroids in topical therapy in order to achieve the combined advantages of anti-inflammatory and antibiotic activity.

It is an object of this invention to provide useful topical solutions containing steroids and antibiotics.

Another object of this invention is to provide aqueous solutions of steroids and antibiotics in combination which are stable against various degradation and decomposition reactions.

A further object of this invention is to provide such solutions containing sufficiently high concentrations of steroids and antibiotics to enable their use as topical formulations.

It is yet a further object of this invention to provide steroid-antibiotic formulations which are highly stable upon standing for long periods of time.

Other objects and advantages of the instant invention will become apparent in the course of the following detailed description and disclosure.

The above listed and other objects are accomplished by using a mixture of a steroid phosphate, an antibiotic and a suitable stabilizer in an aqueous solution which is maintained at a neutral or slightly alkaline pH and preferably a pH of from pH 7.0 to 7.8 by the use of a suitable buffer.

The steroid phosphates suitable for these formulations are the phosphates of steroids of the pregnane series, particularly those of the $\Delta^4$- and the $\Delta^{1,4}$-steroids such as cortisone, hydrocortisone, prednisone and prednisolone. However, any other steroid phosphate having anti-inflammatory activity and which is sufficiently soluble in water to provide the desired therapeutic effect may be employed. Thus, for example, the various halogenated and otherwise substituted derivatives of the above-mentioned compounds can be used with equal facility. Illustrative of these are the 9-halo compounds such as, for example, 9-$\alpha$-fluorohydrocortisone phosphate plus the 16-methyl derivatives such as, for example, 16-$\alpha$-methylprednisolone phosphate and compounds containing both the 9-halo and 16-methyl groups such as, for example, 9-$\alpha$-fluoro-16-$\alpha$-methyl prednisolone phosphate.

The steroid phosphate is advantageously used as a salt. Of the salts which are particularly useful, the sodium salts and the triethylamine salts are of special interest, but other water-soluble alkali metal or organic base salts may likewise be used.

The concentration of steroid phosphate employed in topical formulations will, of course, vary, depending on such factors as the activity of the particular steroid employed and the particular use intended; but in general, satisfactory results are obtained when the steroid phosphate is present in an amount ranging from about 0.025% to about 1% by weight (as the free acid) of the formulation. When prednisolone phosphate is employed, concentrations in the order of from 0.1% to 1% are quite satisfactory. With the more active steroid phosphates such as, for example, 9-$\alpha$-fluoro-16-$\alpha$-methylprednisolone phosphate, lower concentrations, generally in the range of from about 0.025% to about 0.25%, are satisfactory.

The antibiotic which is included in these formulations for the purpose of preventing the spread of infection is preferably a basic antibiotic. The antibiotic of choice is neomycin. However, other antibiotics which are soluble in water in an amount sufficient to provide at least a prophylactic effect and are substantially nontoxic when administered topically such as, for example, kanamycin, polymyxin B, streptomycin and the like may be used. It will be readily appreciated that the antibiotic may be employed as the free base or in the form of a salt such as the sulfate or hydrochloride, and accordingly the term "antibiotic" as used herein is meant to include both the free base as well as the salts thereof.

Although the concentration of antibiotic in topical formulations can be varied somewhat depending on the antibiotic employed and the effect desired, formulations containing from about 0.2% to about 0.5% by weight of the antibiotic (as the free base) are satisfactory for topical application.

The mixture of a steroid phosphate and a basic antibiotic in aqueous solution causes the precipitation of a complex of the steroid and the antibiotic. Since dispersions or suspensions are not satisfactory for topical use such as in ophthalmic medications, the furnishing of various other ingredients in a steroid-antibiotic solution is absolutely essential. While solubilizing agents in themselves would be sufficient if the problem were simply one of precipitation of a complex under given conditions of solubility, in the case of steroids having side-chains in the 17-position and various centers of unsaturation in the molecule, the problem of stabilization is compounded in that decomposition of the steroid by oxidation or other chemical reaction must also be provided against. Likewise, the basic antibiotics are not characterized by a high degree of stability in aqueous solution and stabilization of the antibiotic becomes another necessary measure in the provision of solutions suitable for ophthalmic use and use in various other topical medicaments.

To prevent oxidative degradation of both the antibiotic and the steroid in solutions to be stored for prolonged periods, it has been found advantageous to incorporate a pharmaceutically suitable antioxidant in these formulations. Both inorganic and organic antioxidants have been found suitable for this purpose. For example, inorganic antioxidants such as sodium sulfite, sodium bisulfite and sodium hypophosphite and organic antioxidants such as penicillamine, pyridinesulfinic acid, sodium formaldehyde sulfoxylate and thiourea have been found suitable for this purpose, but other antioxidants which are pharmaceutically acceptable for ophthalmic and other topical uses may likewise be used. However, sodium bisulfite, sodium sulfite, sodium hypophosphite, and mixtures thereof are particularly useful and preferred.

When an antioxidant or a mixture of antioxidants is employed in the formulations, satisfactory results are obtained when the same is present in an amount ranging from about 0.1% to about 0.4% by weight of the formulation.

For stabilization of the aqueous combination of the steroid phosphates and the antibiotics, it has been found desirable to employ an organic nitrogen containing stabilizer selected from the limited group consisting of creatinine and N-alkyl substituted derivatives thereof such as, for example, N-methylcreatinine.

While other organic nitrogen-containing stabilizers are known, they have been found to be either unsatisfactory or not particularly desirable for use in the topical formulation of the invention. The above-mentioned stabilizers, however, are quite satisfactory and particularly useful because they are both pharmaceutically acceptable and highly effective in stabilizing the aqueous combination of steroid phosphate and antibiotics when present therein in relatively low concentrations. In general, we have found that when these stabilizers are employed in an amount ranging from about 0.2% to about 1% by weight of the formulation, satisfactory results are obtained although somewhat higher concentrations may be employed if desired.

In addition to the stabilizer, it is frequently desirable but not essential to include one or more solubilizing agents which are nonionic surfactants, for example, the Tweens, a series of polyoxyalkylene derivatives of hexitol anhydride partial long chain fatty acid ester surfactants which are generically known as the polysorbates. Of these, Polysorbate 80, which is a polyoxyalkylene derivative of sorbitan monooleate, is a preferred species. Alternatively, surfactants such as the Pluronics, a series of compounds which are high molecular weight condensation products of ethylene oxide with a hydrophobic base formed by the condensation of propylene oxide with propylene glycol may be used. Another satisfactory surfactant is Triton X–100, an aryl alkyl polyether alcohol. In general, any pharmaceutically acceptable water-soluble, nonionic surfactant would be satisfactory for use as a solubilizing agent.

When it is desired to include a solubilizing agent in the formulations of this invention, satisfactory results are obtained when the solubilizing agent is present in an amount ranging from about 0.05% to about 0.25% by weight of the formulation.

To guard against bacterial decomposition of the solutions of the instant invention, a preservative is generally included in these formulations. Suitable preservatives include phenylethanol, benzalkonium chloride, methyl p-hydroxybenzoate and propyl p-hydroxybenzoate. Other suitable preservatives or germicidal agents may be used provided that these agents are such as to not produce irritation when used in ophthalmic or other topical application. However, if the preparation of these formulations is carried out under absolutely sterile conditions and if the formulation is used immediately, then the preservative may be omitted.

If the addition of a preservative is desired, satisfactory results are obtained when the same is present in an amount ranging from about 0.02% to about 0.5% by weight of the formulation.

In order to maintain the ingredients of the topical formulations in solution and to assure maximum steroid stability, it has been found necessary to maintain the solution at a neutral or slightly alkaline pH and preferably at a pH of from about pH 7.0 to about pH 7.8. For buffering the solutions at this pH range, it has been found that a borate buffer, that is, a mixture of sodium borate and boric acid, is particularly suitable. In addition to a borate buffer, other substances which may be used include sodium citrate, monosodium phosphate and disodium phosphate and appropriate mixtures of these substances.

The following examples are included for the purpose of illustration and are not to be construed as any undue limitation of the scope of the appended claims.

*Example 1*

A formulation having the following composition was prepared as described below:

|  | Percent |
|---|---|
| Prednisolone phosphate (as disodium salt) | 0.50 |
| Neomycin (as sulfate) | 0.35 |
| Creatinine | 0.50 |
| Sodium borate | 2.00 |
| Boric acid | 2.00 |

Distilled water, to make 100.00 percent.

The boric acid and sodium borate were dissolved in about four-fifths of the previously boiled and nitrogen-sparged distilled water. pH was in the range of 7.4 to 7.6. Sparging was continued with nitrogen and creatinine, prednisolone phosphate and neomycin sulfate were dissolved in that order. The mixed solution was sterilized by aseptic filtration using nitrogen pressure. The sterile filtrate was assayed for steroid, then diluted to volume using sterilized water and subdivided into suitable vials for immediate use.

*Example 2*

A formulation having the following composition was prepared in accordance with the procedure of Example 1 except that 9-α-fluoro-16-methyl prednisolone phosphate was employed in place of prednisolone phosphate.

|  | Percent |
|---|---|
| 9-α-fluoro-16-α-methylprednisolone phosphate (as di-sodium salt) | 0.10 |
| Neomycin (as sulfate) | 0.35 |
| Creatinine | 0.50 |
| Sodium borate | 2.00 |
| Boric acid | 2.00 |

Distilled water, to make 100.00 percent.

*Example 3*

A formulation having the following composition was prepared in accordance with the procedure of Example 1 except that the polymyxin B was employed in place of neomycin.

| Prednisolone phosphate (as disodium salt) | percent | 0.50 |
|---|---|---|
| Polymyxin B (as sulfate) | units | 10,000 |
| Creatinine | percent | 0.50 |
| Sodium borate | do | 2.00 |
| Boric acid | do | 2.00 |

Distilled water, to make 100.00 percent.

*Example 4*

A formulation having the following composition was prepared as an ophthalmic solution as described below:

|  | Percent |
|---|---|
| Prednisolone phosphate (as di-sodium salt) | 0.50 |
| Neomycin (as sulfate) | 0.35 |
| Sodium bisulfite | 0.32 |
| Sodium borate | 0.30 |
| Sodium citrate | 2.00 |
| Creatinine | 0.50 |
| Polysorbate 80 | 0.20 |
| Benzalkonium chloride | 0.02 |

Sodium hydroxide to adjust to pH 7.5.
Distilled water, to make 100.00 percent.

The sodium borate, sodium citrate and creatinine were dissolved to water previously boiled and nitrogen sparged then prednisolone phosphate, Polysorbate 80, benzalkonium chloride, sodium bisulfite and neomycin sulfate were dissolved in that order and the pH of the solution adjusted to 7.5 by the addition of sodium hydroxide. The solution was then sterilized by aseptic filtration under nitrogen pressure and subdivided.

*Example 5*

A formulation having the following composition was prepared as an ophthalmic solution in accordance with the procedure of Example 4 except that 9-α-fluoro-16-α-methyl prednisolone phosphate was employed in place of prednisolone phosphate.

| | Percent |
|---|---|
| 9-α-fluoro-16-α-methyl prednisolone phosphate (as disodium salt) | 0.10 |
| Neomycin (as sulfate) | 0.35 |
| Sodium bisulfite | 0.32 |
| Sodium borate | 0.30 |
| Sodium citrate | 2.00 |
| Creatinine | 0.50 |
| Polysorbate 80 | 0.20 |
| Benzalkonium chloride | 0.02 |

Sodium hydroxide to adjust to pH 7.5.
Distilled water, to make 100.00 percent.

The stability of the solution of this example was determined by permitting the solution to stand at various temperatures for various periods of time as shown in the following table:

STABILITY OF 9-α-FLUORO-16-α-METHYL PREDNISOLONE PHOSPHATE AND NEOMYCIN SULFATE OPHTHALMIC SOLUTION

| Temperature | Time | 9-α-Fluoro-16-α-methyl prednisolone phosphate, percent remaining | Neomycin sulfate, percent remaining |
|---|---|---|---|
| Initial | | 113 | 119 |
| 50° C | 2 weeks | 105 | |
| 37° C | 1 month | | 112 |
| 37° C | 3 months | 104 | 106 |
| 37° C | 7 months | | 107 |
| 25° C | 3 months | 113 | 118 |
| 25° C | 7 months | | 108 |
| 25° C | 8½ months | 107 | |

*Example 6*

A formulation having the following composition was prepared as follows:

| | Percent |
|---|---|
| Prednisolone phosphate (as di-sodium salt) | 0.50 |
| Neomycin (as sulfate) | 0.35 |
| N-methyl creatinine | 0.20 |
| Sodium citrate | 2.00 |
| Sodium borate | 0.30 |
| Polysorbate 80 | 0.20 |
| Pyridinesulfinic acid | 0.25 |
| Benzalkonium chloride | 0.02 |

Sodium hydroxide to adjust pH to 7.5.
Distilled water, to make 100.00 percent.

The sodium citrate and sodium borate were dissolved in water previously boiled and nitrogen-sparged and the prednisolone phosphate then dissolved. The resulting solution was clarified by filtration. The pyridinesulfinic acid, benzalkonium chloride, Polysorbate 80 and neomycin sulfate were then dissolved in an equal volume of water previously nitrogen-sparged. The two solutions were mixed and the pH adjusted to pH 7.5 by the addition of only so much sodium hydroxide as was necessary. The N-methylcreatinine was then added and stirred into solution. The solution was sterilized by aseptic filtration under nitrogen pressure and then subdivided.

*Example 7*

A formulation having the following composition was prepared as an ophthalmic solution as described below:

| | Percent |
|---|---|
| Prednisolone phosphate (as di-sodium salt) | 0.50 |
| Neomycin (as sulfate) | 0.35 |
| Sodium bisulfite | 0.05 |
| Sodium hypophosphite | 0.30 |
| Creatinine | 0.50 |
| Sodium citrate | 2.00 |
| Sodium borate | 0.30 |
| Polysorbate 80 | 0.20 |
| Benzalkonium chloride | 0.02 |
| Ethylenediaminetetra acetic acid | 0.05 |

Hydrochloric acid to adjust pH to 7.5.
Distilled water, to make 100.00 percent.

The sodium citrate, sodium borate, creatinine and ethylenediamine tetra acetic acid were dissolved in water previously boiled and nitrogen-sparged. The remaining materials were then added and the pH adjusted to 7.5 with hydrochloric acid. The solution was adjusted to volume and then sterilized by aseptic filtration and then subdivided.

*Example 8*

A formulation having the following composition was prepared in accordance with the procedure of Example 4 except that kanamycin was employed in place of neomycin.

| | Percent |
|---|---|
| Prednisolone phosphate (as di-sodium salt) | 0.500 |
| Kanamycin (as sulfate) | 0.350 |
| Creatinine | 0.500 |
| Sodium bisulfite | 0.350 |
| Sodium citrate | 2.000 |
| Sodium borate | 0.300 |
| Benzalkonium chloride | 0.020 |
| Polysorbate 80 | 0.200 |

Sodium hydroxide to adjust to pH 7.5.
Distilled water, to make 100.00 percent.

*Example 9*

A formulation having the following composition was prepared in accordance with the procedure of Example 8 except that 9-α-fluoro-16-α-methylprednisolone phosphate was employed in place of prednisolone phosphate.

| | Percent |
|---|---|
| 9-α-fluoro-16-α-methylprednisolone phosphate (as di-sodium salt) | 0.100 |
| Kanamycin (as sulfate) | 0.350 |
| Creatinine | 0.500 |
| Sodium bisulfite | 0.350 |
| Sodium citrate | 2.000 |
| Sodium borate | 0.300 |
| Benzalkonium chloride | 0.020 |
| Polysorbate 80 | 0.200 |

Sodium hydroxide to adjust pH to 7.5.
Distilled water, to make 100.00 percent.

While the formulations of this invention have been described with particularity and their use as ophthalmic solutions indicated, it is also intended that these solutions may be used for other related pharmaceutical purposes such as in other topical applications, for example, in relief of aural inflammations or infections.

Various changes and modifications of the invention can be made, and to the extent that such variations incorporate the spirit of the instant invention, they are intended to be included within the scope of the appended claims.

This application is a continuation-in-part of our copending application, Serial No. 726,351, filed April 4, 1958, and now abandoned.

What is claimed is:
1. A pharmaceutical formulation comprising, in an aqueous solution having a pH in the range of from about 7.0 to about 7.8, (a) an anti-inflammatory steroid phosphate, (b) a non-toxic basic antibiotic, and (c) a stabilizer to prevent precipitation resulting from interaction between said steroid and antibiotic, said stabilizer being selected from the group consisting of creatinine and N-methyl creatinine.

2. The composition of claim 1 wherein the stabilizer is creatinine.

3. The composition of claim 1 wherein the stabilizer is N-methyl-creatinine.

4. The composition of claim 1 wherein the antibiotic is neomycin.

5. The composition of claim 2 wherein the antibiotic is neomycin and the steroid is prednisolone phosphate.

6. The composition of claim 2 wherein the antibiotic is neomycin and the steroid is 9α-fluoro-16α-methyl prednisolone phosphate.

7. The composition of claim 2 wherein the antibiotic is neomycin sulfate and the steroid is the disodium salt of prednisolone phosphate.

8. The composition of claim 2 wherein the antibiotic is neomycin sulfate and the steroid is the disodium salt of 9α-fluoro-16α-methyl prednisolone.

9. A pharmaceutical formulation comprising, in an aqueous solution having a pH in the range of from about 7.0 to about 7.8, (a) the disodium salt of prednisolone phosphate, (b) neomycin sulfate, (c) a preservative, (d) a non-ionic surfactant, and (e) as a stabilizer to prevent precipitation resulting from interaction between said steroid and antibiotic, creatinine.

10. A pharmaceutical formulation comprising, in an aqueous solution having a pH in the range of from about 7.0 to about 7.8, (a) the disodium salt of 9α-fluoro-16α-methyl prednisolone, (b) neomycin sulfate, (c) a preservative, (d) a non-ionic surfactant, and (e) as a stabilizer to prevent precipitation resulting from interaction between said steroid and antibiotic, creatinine.

References Cited in the file of this patent

UNITED STATES PATENTS

| | | |
|---|---|---|
| 2,657,171 | Macek et al. | Oct. 27, 1953 |
| 2,736,681 | Tishler | Feb. 28, 1956 |
| 2,779,775 | Sarett | Jan. 27, 1957 |
| 2,808,361 | Bavoucet | Oct. 1, 1957 |
| 2,970,944 | Charnicki et al. | Feb. 7, 1961 |

OTHER REFERENCES

Lyman et al.: Am. Pharm., 4th Ed., 1955, pages 264, 282, 283.

P.D.R., 11th Ed., 1956, page 609, entry "Du-Biotic."

Dale et al.: J.A. Ph. A. (Pract. Pharm. Ed.), 18:7, pages 421–425, July 1957.

Neo-Hydeltrasol, T.M. File No. 652,650, registered October 13, 1957.